J. R. THOMAS

Aug. 9, 1932. SPRING CONSTRUCTION FOR FURNITURE Re. 18,560

Original Filed April 14, 1927 3 Sheets-Sheet 1

Inventor
Joseph R. Thomas.

By William C. Linton.
Attorney.

J. R. THOMAS

Aug. 9, 1932. SPRING CONSTRUCTION FOR FURNITURE Re. 18,560

3 Sheets-Sheet 2

Original Filed April 14, 1927

Inventor
Joseph R. Thomas.

By William C. Sutor
Attorney

J. R. THOMAS

Aug. 9, 1932. SPRING CONSTRUCTION FOR FURNITURE Re. 18,560

Original Filed April 14, 1927 3 Sheets-Sheet 3

Inventor
Joseph R Thomas.

By William E. Sutton
Attorney

Reissued Aug. 9, 1932

Re. 18,560

UNITED STATES PATENT OFFICE

JOSEPH R. THOMAS, OF FORT MADISON, IOWA, ASSIGNOR OF ONE-HALF TO THE ROME COMPANY, INC., A CORPORATION OF NEW YORK

SPRING CONSTRUCTION FOR FURNITURE

Original No. 1,694,995, dated December 11, 1928, Serial No. 183,796, filed April 14, 1927. Application for reissue filed December 9, 1930. Serial No. 501,144.

This invention relates to improvements in spring constructions for furniture, such for example as davenports, day beds (both double and single) sofas, chairs and the like, having for an object to provide an arrangement of springs which will afford a resiliency of maximum depth and wherein the advantages of a coiled spring support will be had, hence, lending materially to the comfort available through usage of furniture of this particular character.

It is also an object of the invention to provide a spring construction wherein the springs are so arranged and relatively connected that they will be caused to function in groups or sections and thereby will prevent malshaping of the cushion or pad or other device receiving the same, likewise, will prevent relative displacement of the springs, consequently, increasing the durability of the construction.

The invention also includes amongst its desirata, the provision of a spring construction of the character mentioned wherein the main body and subsidiary sections are included, the subsidiary sections functioning to resiliently absorb stresses when the device is used as a seat, whereas both the main body and said subsidiary sections are utilized when the device is used as a bed, providing in this latter adaptation, a maximum spring supporting area.

A further object of the invention is in the provision of an invertible seat spring structure in which the resiliency of the same springs is utilized on opposite sides of the seat when using the opposite surfaces as a seat and for sleeping purposes.

Other objects of the invention will be in part obvious and in part pointed out hereinafter.

In order that the invention and its mode of operation may be readily understood by those skilled in the art, I have in the accompanying illustrative drawings and in the detailed following description based thereupon, set out one possible embodiment of the invention.

Figure 1:
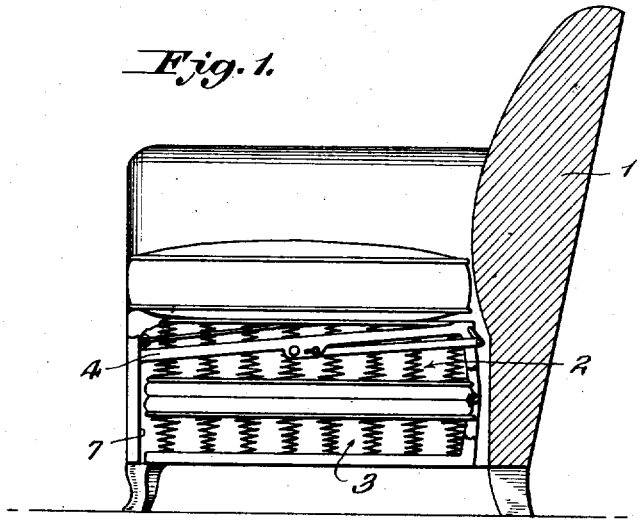
Figure 5:
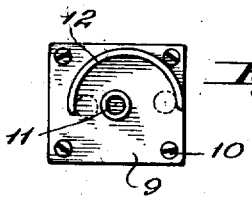
Figure 2:
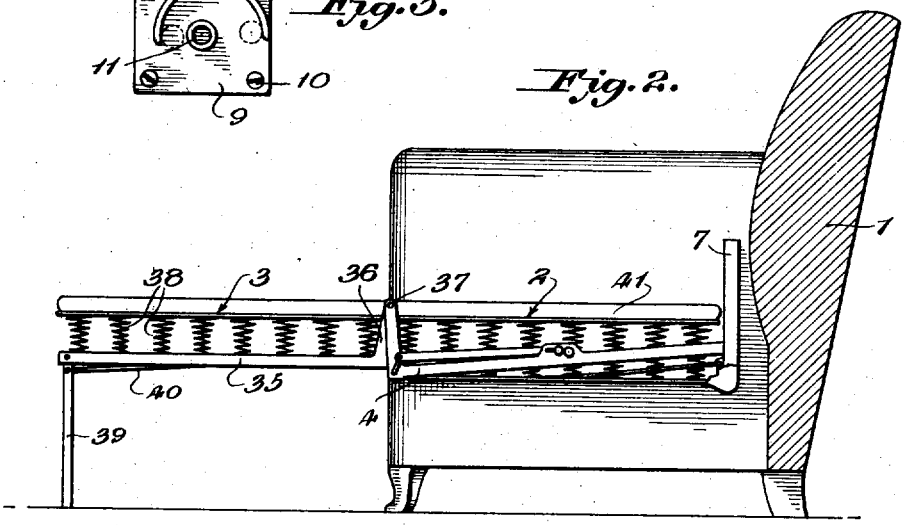
Figure 8:
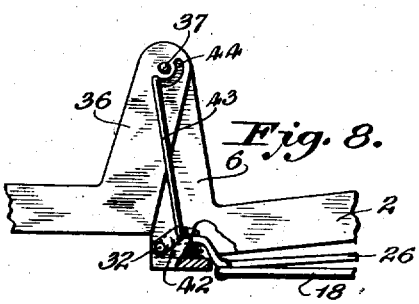
Figure 3:
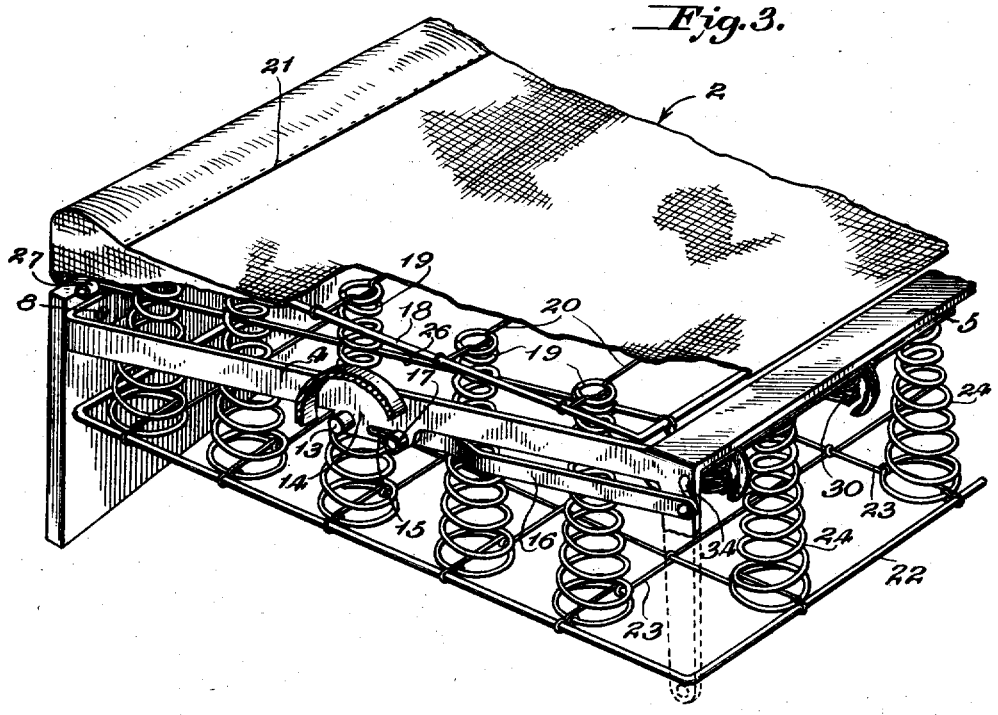
Figure 4:
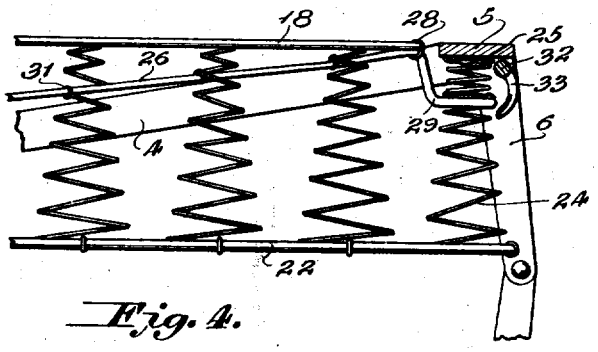
Figure 6:
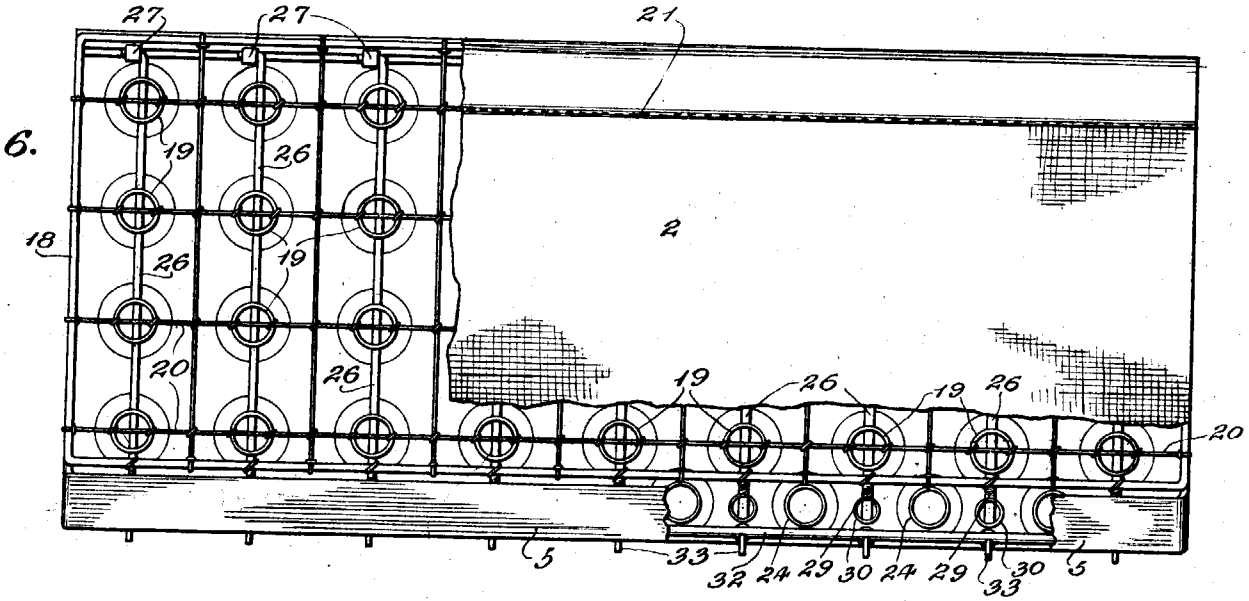
Figure 7:
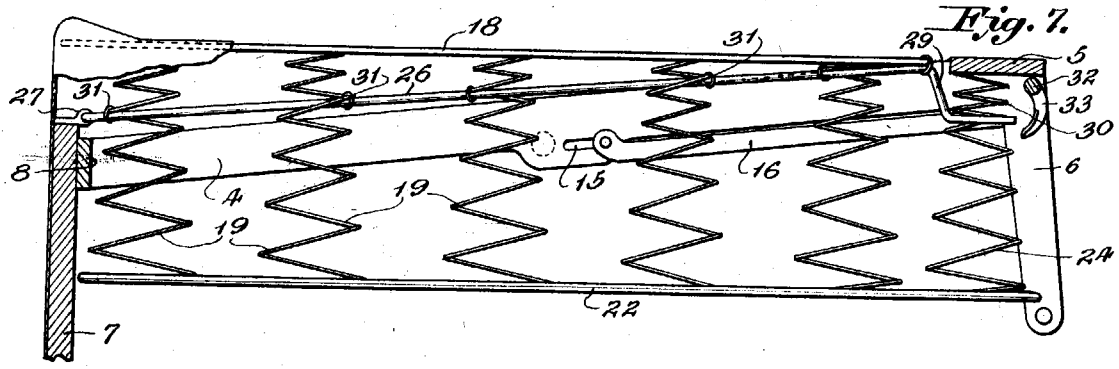

In these drawings:

Figure 1 is a vertical transverse section through a davenport wherein the improved spring construction is incorporated, Figure 2 is a similar view showing the davenport in open position or converted for usage as a bed, Figure 3 is an enlarged fragmentary detail in perspective, having parts thereof broken away to show the arrangement or disposition of the springs included by the main body and subsidiary sections, Figure 4 is an enlarged fragmentary detail in transverse section through a portion of the spring construction, particularly, the normally uppermost section, Figure 5 is a detail in elevation of the particular form of cam strip employed in connection with the swingable and normally upper spring construction, Figure 6 is a top plan view of the normally upper or outer spring construction, Figure 7 is an enlarged vertical transverse section through the same, and Figure 8 is a fragmentary detail, partly in elevation showing a slightly modified construction or arrangement of cam actuating means for use in connection with the normally upper spring construction.

In an invertible type of davenport, day or chair bed, it is customary to use the seat section as one of the bed sections and in the coil spring type of beds it is difficult to provide a seat structure which is also adapted to be used as a bed section without employing different or additional springs for the opposite surfaces. The present invention provides an invertible seat structure in which the coil spring frame is so mounted in the seat frame that the same springs may be used both as a seat and as a support for sleeping surfaces on opposite sides of the coil spring frame.

Having more particular reference to the drawings, in connection with which like characters of reference will designate corresponding parts throughout, 1 generally indicates a davenport construction having the sides and the back thereof suitably upholstered or otherwise finished, as is common in the art, while spring carrying sections are designated in their entireties by the numerals 2 and 3.

The spring carrying section 2 consists of a body portion formed of scrap or similar metal, substantially rectangular in configuration and having obliquely disposed sides 4 and one end thereof widened and arranged in a plane at substantially right angles to that in which the remaining portions of such body portion are arranged, the widened and flattened end being designated by the numeral 5. Complemental right angularly disposed arms 6 are formed integral with the opposite extremities of the end 5 of the body portion, while to the opposite end of said body portion, a panel or end board 7 is secured through the medium of bolts or screws designated at 8; it being noted in this connection, that with arrangement of the body portion in its normal horizontal position, the flattened and widened end 5 thereof will be spaced vertically from that end of the same having the end board or panel 7 connected thereto.

Bearing bracket plates 9 are secured through screws or similar fastening devices 10 to the inner faces of the opposite sides of the davenport 1, these plates having suitable bearings 11 fixed thereupon and segmental bearing strips 12 also fixedly arranged thereupon, the latter being eccentric to the bearings 11. Pintles 13 fixedly mounted upon the widened and intermediate portions 14 of the opposite sides of the body portion are adapted to be rotatably engaged in the bearings 11 of the plates 9 and thus, it will be understood that said body portion is, in this manner, pivotally supported with respect to the davenport 1. Also, longitudinally disposed slots 15 are formed in the widened intermediate portion 14 of the opposite side of the body portion and slidably receive therethrough pins carried upon the adjacent ends of connecting arms 16, these latter, as will be noted upon reference to the Figures 1 and 3, closing substantially parallel to adjacent portions of said opposite side of the body portion. Rollers 17 are mounted upon those portions of said pins extended beyond the outer faces of the widened intermediate portions 14 and such rollers are adapted to be engaged with and over the segmental bearing strips 12, whereby with pivotal movement of the body portion with respect to the opposite sides of the davenport 1, a longitudinal movement will be imparted to the connecting arms 16, the purpose of which will be subsequently described.

A frame of substantially rectangular configuration, designated by the numeral 18 is received within the normally upper portion of the body portion it being noted in this connection that one end of the frame is adjacent to the inner marginal portion of the widened and flattened end 5 and is substantially flush therewith. A plurality of coiled springs generally indicated by the numeral 19 are connected through suitable tie rods 20 and at regularly spaced intervals throughout the frame 18, while suitable upholstery 21 is arranged over the normally outer side of the frame 18 for obvious purposes.

A second and larger rectangular frame 22 is provided for the opposite side of section 2 and as will be noted upon reference to the Figures 3 and 4, this frame is connected to the adjacent ends of the various coiled springs 19 through the medium of appropriately arranged tie rods 23 having connection at their opposite ends with adjacent portions of said frame 22.

Other coiled springs 24 are connected at their basal portions to the frame 22 through the medium of tie rods 23 and the opposite extremities of the springs are connected by suitable clamps or connecting means 25 to the adjacent side of the flattened and widened end 5 of the body portion; it being noted in this connection that the springs 24 are staggered in their transverse disposition with respect to the aforementioned springs 19.

A plurality of longitudinally disposed rods 26 are provided the section 2, the normally forward ends of said rods being pivoted as at 27 to the normally upper end of the panel 7, as is shown in the Figures 3 and 6, these rods 26 being disposed obliquely and in approximate parallelism to the obliquely disposed opposite sides 4 of the body portion, aforesaid; the free ends of said rods being connected through suitable devices 28 to adjacent ends of the spring engaging frame 18, whereupon they are provided with integral right angularly formed extensions or arms 29, the extremities of which are arranged in substantial parallelism to the normally under side of the flattened and widened end 5 and in perpendicularly spaced relation thereto, as is clearly shown in the Figure 4. Auxiliary springs 30 are arranged between the said parallel extremities of the angular extensions 29 and the adjacent portions of said end 5, thus serving as means for effecting a yieldable connection as between the rods 26 and said end 5 of the body portion of the section 2.

That collective movement and an even diffusion of stresses directed onto the upholstery 21 may be effected through the springs 19, those portions of each of the rods 26 adjacent the springs 19 are connected to the same through clips or similar means 31.

A shaft 32 is mounted in suitable bearings provided therefor in portions of the arms 6 and is arranged adjacent the normally under side of the flattened and widened end 5, said shaft carrying a plurality of relatively fixed curved fingers 33 adapted, at times, to be engaged with adjacent portions of the extensions 29; the opposite ends of said shaft 32 being formed with crank-like extensions 34 having pivotal connection with the adjacent ends of the connecting arms 16, hereinbefore described.

The section 3 may be stated to comprise a body portion 35 formed of scrap metal or other suitable material having arms 36 integral with certain of the ends thereof in order that a pivotal connection as at 37 may be effected between the two sections 2 and 3; coiled spring carrying frames being provided said body portion 35, between which a plurality of relatively spaced coiled springs 38 are connected.

Supporting legs 39 are pivotally connected to those ends of the body portion 5 opposite the arms 36 and these legs are adapted to be automatically moved from inoperative to operative positions, as is shown in the Figure 2, through the medium of connecting rods 40 and suitable motion transmitting means, not shown herein.

A foldable pad or mattress 41 is of course provided the sections 2 and 3 and with conversion of the davenport into a bed, is adapted to be arranged in the manner shown in the Figure 2.

In the Figure 8, I have shown a slightly modified form of means for transmitting rotary motion to the shaft 32, engaging crank like extensions 42 with the opposite extremities of said shaft, while the free ends of said crank like extensions are pivotally engaged by rods 43 arranged adjacent the normally outer sides of the arms 6 of the section 2. Segmental slots or ways 44 are formed in the free extremities of the arms 36 of the section 3, which as will be borne in mind, are pivotally connected to the arms 6 as at 37, and the adjacent ends of said rods 43 are formed with angular extensions slidably engaged in said slots or ways 44. Thus, with pivotal movement as between the arms 6 and 36, a rectilinear movement will be imparted to each of the rods 43 and consequently thereupon, the shaft 32 will be rotated or partially rotated.

In operation of my improved davenport construction when it is desired to convert the same into a bed, the superimposed sections 2 and 3, as is shown in the Figure 1 are rotated by reason of the rotatable engagement of the pintles 13 upon the opposite sides of the body portion of the section 2. The sections 2 and 3 are rotated until the panel or end board 7 assume that position as is shown in the Figure 2, whereupon the section 3 is swung outwardly from the section 2 by reason of the pivotal connection 37 between the arms 6 and 36, to that position as is also shown in the Figure 2, whereupon the supporting legs 39 of the section 3 will be automatically moved to their operative or supporting positions. With pivotal movement of the section 2, it will be understood that a rectilinear or longitudinal movement will be imparted to the connecting arms 16 or rods 43, thereby rocking the shaft 32 and causing inward swinging movement of the curved fingers 33 into engagement with the free ends of the right angularly formed extensions 29 upon the connecting rods 26. In this way, the auxiliary springs 30 will be compressed and consequently thereupon, the right angularly formed extensions 29 will be brought into fixed engagement with the flattened and widened end 5 of the body portion of said section 2, hence, preventing objectionable vibratory movement of said flattened and widened end 5 with the application of weight or stress to the springs 19.

With arrangement of the section 2 in the position as shown in the Figure 2, it will be understood that a resilient supporting medium will be provided for the mattress or pad 41 engaged thereover, in that the spring engaging frame 22 will transmit and evenly diffuse such stresses as might be applied thereto throughout the springs 19 and 24; it being noted that the springs 24 have certain of their ends connected to said frame 22 and their opposite ends connected to the flattened and widened end 5 of the body portion. Also, as hereinbefore stated, because of the fact that the opposite ends of the springs 19 are engaged with the tie rods 20 of the spring frame 18 and the latter is fixedly connected to the flattened and widened end 5 of the body portion 2 of said section when the bed is opened, and effectual supporting means will be afforded said springs 19, whereby to permit the same to effectually function.

When the davenport is used as a seat, that is, it is arranged in that form as is shown in the Figure 1, it will be understood that the panel 7 will serve as a closure for the now outer ends of the sections 2 and 3 whereas the obliquely arranged and diagonally disposed connecting rods 26 will serve as a means for evenly distributing stresses applied to the seat throughout the spring construction. Furthermore, it will be understood and appreciated that because of the connections as between the intermediate portions of the connecting rods 26 and the adjacent springs 19, those portions of such springs above their respective tie rods 26 will function to resiliently absorb minor or lesser stresses imparted thereto, while with transmission of major stresses to the seat, said connecting rods 26 will be permitted to pivotal movement at their respective pivotal mountings 27 and hence, will function to evenly diffuse and absorb such major stresses throughout the spring construction of the section 2 and likewise of the section 3 arranged immediately therebelow. Furthermore, it will be understood that because of the interpositioning of the auxiliary springs 30 between the right angularly formed extensions 29 of the rods 26 and the flattened and widened end 5 of the body portion of said section 2, said extensions 29 will be prevented from contacting with the end 5 and producing annoying noise.

Manifestly, the construction shown is capable of considerable modification and such modification as is within the scope of my claims, I consider within the spirit of my invention.

I claim:

1. In a davenport, a plurality of pivotally connected spring carrying sections, adapted to be arranged in superposed relation, at times, one of said sections comprising a substantially rectangular body portion, bearing means on the intermediate portions of the sides thereof for pivotally supporting the same upon the davenport, a panel fixed to the front of the body portion, a coiled spring engaging frame received within the body portion arranged flush with the rear thereof, another frame connected to the opposite ends of the coiled springs, certain of the coiled springs being connected to the rear of said body portion, a plurality of longitudinal rods pivoted at one end to the panel and connected to portions of certain of the coiled springs and free at the other end, said rods having angular extensions on their free ends disposed in proximity to the rear of the body portions, auxiliary springs connected to and extending between said extensions and said rear, and means engageable with said auxiliary springs for automatically compressing the same, upon pivotal movement of said sections.

2. In a davenport, a plurality of pivotally connected spring carrying sections, adapted to be arranged in superposed relation, at times, one of said sections comprising a substantially rectangular body portion having obliquely disposed opposite sides and one end thereof being flattened and widened, bearing means on the intermediate portions of the sides of said body portion for pivotally supporting the same upon the davenport, a panel fixed to that end of the body portion opposite said flattened and widened end, a coiled spring engaging frame received within the body portion arranged flush with the flattened and widened end thereof, another frame connected to the opposite ends of the coiled springs, certain of the coiled springs being connected to said flattened and widened end of the body portion and arranged in staggered relation with respect to the remaining springs, a plurality of longitudinal rods pivoted at one end to the panel and connected to portions of certain of the coiled springs, said rods having free ends and angular extensions on their free ends disposed in proximity to the flattened and widened end of the body portion, auxiliary springs arranged between said extensions and flattened and widened end, and means engageable with said auxiliary springs for automatically compressing the same upon pivotal movement of said body portions.

3. In a davenport, a plurality of pivotally connected spring carrying sections, adapted to be arranged in superposed relation, at times, one of said sections comprising a substantially rectangular body portion having obliquely disposed opposite sides and a widened and flattened end, bearing means on the intermediate portions of the obliquely disposed sides for pivotally supporting the body portion upon the davenport, a panel fixed to one end of the body portion, a coiled spring engaging frame received within the body portion and arranged flush with the flattened and widened end, another frame connected to the opposite ends of the coiled springs, certain of the coiled springs being connected to said flattened and widened end of the body portion and arranged in transversely staggered relation with respect to the remaining springs, a plurality of longitudinal rods pivoted to said panel and extended into proximity to the opposite end of said body portion, the intermediate portions of said rods being connected to portions of certain of the coiled springs, each of said rods having a free end and a right angularly formed extension thereon in proximity to the flattened and widened end of the body portion, auxiliary springs interposed between said right angular extensions and said flattened and widened end of the body portion, the intermediate portions of the opposite sides of the body portion having slots formed therein, connecting arms having slidable engagement with said slots, a shaft mounted adjacent to and disposed longitudinally of said flattened and widened end of the body portion having crank like extensions on its opposite ends, the free ends of said connecting arms being engaged with said crank-like extensions, and means upon the davenport engageable with said connecting arms for transmitting rectilinear motion thereto with pivotal movement of the body portion whereby said shaft will be oscillated and said rods moved upon their pivotal connections for compressing said auxiliary springs substantially as and for the purpose specified.

4. In a davenport, a plurality of pivotally connected spring carrying sections adapted to be arranged in superposed relation, at times, one of said sections comprising a substantially rectangular body portion, bearing means on the intermediate portions of the sides thereof for pivotally supporting the same upon the davenport, a panel fixed to one end of the body portion and the other end of the body portion being free, a coiled spring engaging frame received within the body portion having one end inwardly of and adjacent the free end of said body portion, another frame connected to the opposite ends of the coiled springs, certain of the coiled springs being connected to the free end of said body portion and arranged in relatively transverse staggered relation with respect to the remaining springs, a plurality of longitudinal rods pivoted at one end to the panel and connected to portions of certain of the coiled springs and free at the other end, said rods having angular extensions on their free ends disposed in proximity to the free end of the body portion, auxiliary springs arranged between said extensions and said free ends of the body portion, and means for engaging the angular extensions of the rods and thereby fixedly connecting said first frame to the free end of said body portion at times, said means being operable automatically with pivotal movement of the sections.

5. In an invertible seat construction for furniture, a spring section adapted to be used on opposite sides as a seat and as a sleeping surface comprising an overturnable marginal frame, a coil spring frame within the marginal frame, and means at the rear thereof when in seat position for suspending it for vertical movement of the rear part from above within the marginal frame and supporting it at the front upon the marginal frame when inverted, and a connection between the frames at the side opposite the suspension for limited swinging movement.

6. In a davenport, an invertible spring section adapted to be used on opposite sides as a seat and as a sleeping surface, the section comprising a marginal frame, a coil spring frame within the marginal frame free from obstruction on opposite sides thereof, resilient means suspending the coil spring frame from points along one side of the marginal frame substantially above the lower surface of the coil spring frame when in seat position and yieldingly supporting it when inverted, and means for pivotally connecting the coil spring frame upon the side of the other frame opposite the spring suspension for limited swinging movement.

7. A spring structure in accordance with claim 6 in which the pivotal connection of the coil spring frame is along one side of the marginal frame intermediate the opposite sides of the spring frame.

8. A davenport spring section in accordance with claim 6 in which the spring frame has means at the side opposite its pivotal connection with the marginal frame for limiting its movement therein in either direction.

9. In a davenport, an overturning section comprising a marginal frame including a front board, a coil spring frame within the marginal frame, means forming a pivoting connection between the frames at the rear of the front board and intermediate the opposite faces of the spring frame so that a portion of the spring frame projects above the front board in one position thereof.

10. In a davenport, an overturning section comprising a marginal frame which includes a front board, a coil spring frame pivoted along the back of the front board and extending above the front board in one position thereof, the marginal frame having a portion inclined from the front board and extending to the opposite edge and in line with one face of the spring frame.

11. In a davenport, an overturning section comprising a marginal frame including a front panel board, a coil spring frame comprising a plurality of connected rows of coil springs and a pair of marginal frames defining the opposite faces thereof, and means for connecting one side of the coil spring frame to the front board so that the adjacent side of the spring frame extends above the front board, said means comprising rods inclined in the spring frame and connected at different points to the springs of one row and to the opposite side of the top marginal frame of the spring.

12. A davenport spring seat section adapted to be used on opposite sides as a seat and as a sleeping surface comprising an invertible marginal frame, a coil spring frame within the marginal frame having connected rows of coil springs and opposite coil spring marginal frames, means for mounting the coil spring frame for limited swinging movement within the marginal frame at one side thereof, and additional spring means at the other side of the frame for suspending the spring frame from points substantially above it in the marginal frame when in seat position and for limiting and cushioning the movement of the coil spring frame with respect to the marginal frame when inverted.

13. In a davenport seat section, a marginal frame, a coil spring frame comprising a plurality of connected rows of coil springs, means for pivoting the coil spring frame at one side of the marginal frame between the opposite faces of the coil spring frame, the marginal frame being inclined so that the side opposite the pivotal mounting is flush with one of the coil spring frame surfaces, and some of the coil springs at this side of the frame being connected to the marginal frame.

14. In an overturning spring seat structure for davenports, a marginal frame comprising a front board, a coil spring frame comprising connected rows of coil springs with opposite marginal wire frames, means for pivotally connecting one side of the coil spring frame to the top of the front board so that a portion of the spring frame will be above the upper edge of the front board in one position, the marginal frame extending upwardly from the front board flush with the upper face of the coil spring frame at the opposite edge thereof, means comprising a rod extending transversely through the coil spring frame from the top of the front board to the opposite edge of the coil spring wire frame adjacent the marginal frame and having an angular bend below the marginal frame, and coil springs extending between the extension of the rod and from the other coil spring wire frame into engagement with the marginal frame.

15. An invertible seat section having a marginal frame, a coil spring seat frame therein adapted for use on opposite sides as a seat and as a sleeping surface, means attached to the front springs intermediate their ends for pivotally connecting the seat frame at the front of the marginal frame, and springs at the back of the seat frame for yieldingly suspending it from the rear of the marginal frame.

16. In a davenport, an overturning section comprising an invertible marginal frame, a seat therein, and resilient means at the rear of the seat for suspending it from above in the marginal frame when in seat position and resiliently supporting it at the front in inverted position, and a connection between the seat and the frame at the side opposite the suspension for limited swinging movement of the seat with respect to the frame.

17. An invertible seat section comprising an invertible frame having connected front and rear members in different horizontal planes, that one of these frame members which takes a position at the front being lower than that member which takes a position at the rear in both the seat and in the inverted positions, a resilient seat therein having opposite soft edges and means for mounting the seat in the frame to invert therewith and present a soft edge above that one of said members which is at the front of the frame in either position.

18. A davenport seat section having an invertible seat frame, a seat therein, means for connecting one edge of the seat to the edge of the frame, and coil springs connecting the opposite edges of the seat and frame for yieldingly suspending the seat from the frame from points above the lower edges of the seat when in one position and for yieldingly supporting the seat from the frame in the inverted position thereof.

JOSEPH R. THOMAS.